(12) United States Patent
Jones et al.

(10) Patent No.: US 6,559,914 B1
(45) Date of Patent: May 6, 2003

(54) CONDUCTIVE BLACK MATRIX LAYER FOR LCD DISPLAY CONNECTED TO GATE THROUGH TWO VIAS

(75) Inventors: David Paul Jones, Cardiff (GB); Richard Bullock, Newport (GB)

(73) Assignee: International Rectifier Corp., El Segundo, CA (US)

( * ) Notice: Subject to any disclaimer, the term of this patent is extended or adjusted under 35 U.S.C. 154(b) by 0 days.

(21) Appl. No.: 09/898,387

(22) Filed: Jul. 5, 2001

(51) Int. Cl.[7] ............................................. G02F 1/1333
(52) U.S. Cl. ......................................... 349/111; 349/46
(58) Field of Search ........................ 349/44, 33, 38–54, 349/84–166

(56) References Cited

U.S. PATENT DOCUMENTS

| | | | |
|---|---|---|---|
| 5,337,068 A | 8/1994 | Stewart et al. ................ 345/88 |
| 5,666,177 A | 9/1997 | Hsieh et al. ................. 349/111 |
| 5,708,485 A * | 1/1998 | Sato et al. .................... 349/42 |
| 5,721,599 A | 2/1998 | Cheng ......................... 349/106 |
| 5,754,261 A * | 5/1998 | Lyu ............................. 349/44 |
| 5,782,665 A * | 7/1998 | Weisfield et al. ............. 445/24 |
| 5,866,919 A | 2/1999 | Kwon et al. .................. 257/59 |
| 5,926,702 A | 7/1999 | Kwon et al. ................. 438/158 |
| 5,965,916 A * | 10/1999 | Chen .......................... 257/347 |
| 5,990,999 A | 11/1999 | Yeo ............................. 349/139 |
| 6,057,586 A | 5/2000 | Bawolek et al. ............. 257/435 |
| 6,057,896 A | 5/2000 | Rho et al. ..................... 349/42 |
| 6,266,117 B1 * | 7/2001 | Yanagawa et al. .......... 349/141 |

* cited by examiner

Primary Examiner—Robert H. Kim
Assistant Examiner—Timothy L Rude

(57) ABSTRACT

A liquid crystal display device is described in which the TFTs are located directly below the spaces between pixels. The black matrix comprises an array of opaque conductive elements with one such element being above each TFT. The black matrix is incorporated into the TFT structure. By using highly conductive material for the black matrix elements their thickness is held to a minimum, thereby minimizing their impact on planarity. Optionally, this highly conductive layer may be laminated with layers of a non-reflective conductor that makes good ohmic contact to silicon. In one embodiment, metal filled via holes are added that connect the TFTs to the transparent conductive pixel control elements by way of the black matrix layer. In another embodiment, the black matrix layer is connected to be in parallel with the gate electrode, thereby reducing the series resistance of the latter. A process for manufacturing the display is also described.

11 Claims, 3 Drawing Sheets

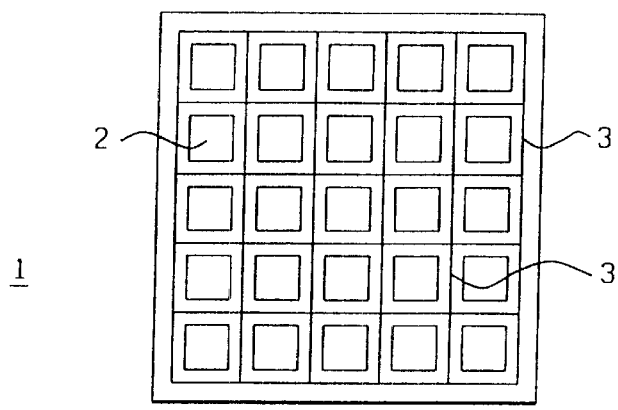
FIG. 1 — Prior Art
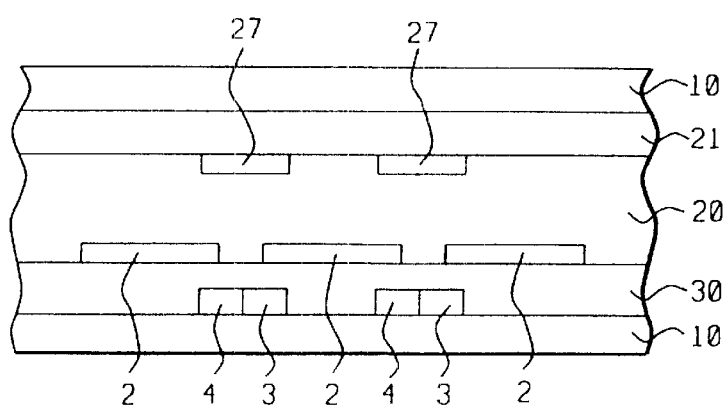
FIG. 2 — Prior Art

CONDUCTIVE BLACK MATRIX LAYER FOR LCD DISPLAY CONNECTED TO GATE THROUGH TWO VIAS

FIELD OF THE INVENTION

The invention relates to the general field of liquid crystal devices (LCDs) with particular reference to novel uses of the black matrix.

BACKGROUND OF THE INVENTION

FIG. 1 is a schematic plan view of a LCD (liquid crystal display) 1 having an array of light valves 2, and row and column addressing lines 3. FIG. 1 shows a 5×5 array of light valves, but typically the LCD display 1 comprises up to 1,200×1,000 light valves 2 and associated addressing lines 3. The valves are shown as square arrays but it is to be understood that other shapes, such as rectangles, can be used. In this example, the LCD display is a transmissive type arranged to selectively allow light through the array depending upon the state of each light valve.

FIG. 2 is a schematic cross-sectional view of the LCD display 1. This display optionally comprises upper and lower outer substrates 10 of a suitable transparent material, such as glass or, for the plate on which the TFT (thin film transistor) is formed, preferably quartz, at a separation of about 1 to 5 $\mu$m. The space between the quartz plates 10 is sealed such as by an epoxy sealant (not shown) and filled with a liquid crystal layer 20, suitably a ferroelectric material or a twisted nematic material. Driving circuitry is carried by the plates 10. One of the plates 10 carries a large, transparent sheet electrode 21 such as indium tin oxide (ITO) that may be coupled to a reference potential such as ground. The other quartz plate 10 carries a driving circuitry layer 30, including a regular array of smaller transparent sheet conductors 2, that define the locations of the pixels of the display, each being connected to a TFT 4 (connections not shown) which is accessed through the row and column addressing lines 3.

In use, a TFT is selectively activated by addressing the row and column addressing lines 3, either from an external circuit or from control circuitry located on chip, in order to change the light transmission properties of the liquid crystal layer 20 in that region, thus forming a light valve corresponding to one pixel of an image.

Another substructure commonly used in LCDs is a black matrix film. The black matrix serves to block out any light that might otherwise leak out through the spaces between pixels, such as 25 in FIG. 2.

The black matrix comprises a grid of opaque elements 27 located, with some overlap, between the light valves 2. Areas directly below the black matrix are where the individual TFTs and row-column addressing lines are located. Although much of the TFT area is itself opaque, there is no guarantee that all light emission between will be blocked since the various parts of the TFTs and row-column addressing lines are irregularly shaped and do not always overlap. Additionally, it is desired to overlap the light valve 2 so as to block out light from its edge where the liquid crystal may not fully block the light because of the non-uniform electric field at the edges of sheet conductors 2. Also, it is desired to shield related portions of the circuitry from visible light and UV radiation in order to minimize possible photoconductivity effects on the TFTs.

In prior art devices (such as shown in FIG. 2) the black matrix 27 is located on the opposite plate to the TFT devices 4. In order to minimize light scattering across the gap between the plates, it needs to be wider than this gap. This in turn, however, reduces the aperture ratio. This is much more of a problem for polysilicon displays used in digital projectors as the pixel size (15–30 microns) is much smaller than in amorphous silicon displays (100–200 microns).

The prior art teaches that the black matrix elements may be either conductive or insulating. Examples of the latter may be found in Kwon et al U.S. Pat. No. 5,866,919 and Kwon et al. U.S. Pat. No. 5,926,702, but in these cases the black matrix was used as part of the phosphor plate rather than being in the TFT plane of the liquid crystal device. Furthermore, black matrices of this type are often found to be unsuitable due to, for example, unpredictable photoconductivity effects and capacitive coupling effects, particularly in neighboring semiconductor layers.

Although conducting black matrices are also commonly used in LCD structures (see, for example, U.S. Pat. No. 5,666,177 Hsieh et al.), they are normally allowed to float electrically or, on occasion, may be embedded within the common ITO (indium tin oxide) layer (31 in FIG. 2) so as to reduce the latter's series resistance (see U.S. Pat. No. 5,721,599 Cheng). Beyond this, no additional uses for the black matrix have thus far been reported. The present invention teaches several additional areas in which the black matrix may be applied without in any way detracting from its light blocking and absorbing capabilities.

SUMMARY OF THE INVENTION

It has been an object of the present invention to provide a liquid crystal display that includes thin film transistors and a light-blocking black matrix that is included within the TFT structure.

Another object of the invention has been to utilize said black matrix for the performance of other functions in addition to light blocking.

A further object of the invention has been to utilize the black matrix to facilitate connecting each thin film transistor to one of the transparent conducting blocks.

A still further object of the invention has been to reduce the series resistance of said TFTs in the display.

Yet another object has been to provide a process for the manufacture of said liquid crystal display.

These objects have been achieved by locating the TFTs directly below the spaces between pixels. The black matrix comprises an array of opaque conductive elements with one such element being above each TFT. By using highly conductive material for the black matrix elements their thickness is held to a minimum, thereby minimizing their impact on planarity. Optionally, this highly conductive layer may be laminated with layers of a non-reflective conductor that makes good ohmic contact to silicon. In one embodiment, metal filled via holes are added that connect the TFTs to the transparent conductive blocks by way of the black matrix layer. In another embodiment, the black matrix layer is connected to be in parallel with the gate electrode, thereby reducing the series resistance of the latter.

BRIEF DESCRIPTION OF THE DRAWINGS

FIG. 1 is a schematic plan view of a liquid crystal display.

FIG. 2 is a schematic sectional side view of the LCD display panel of FIG. 1.

DESCRIPTION OF THE PREFERRED EMBODIMENTS

We will describe the several embodiments of the present invention in terms of a process for its manufacture. Said description will also make clear the structure of the present invention.

1$^{st}$ Embodiment

Figure 3:
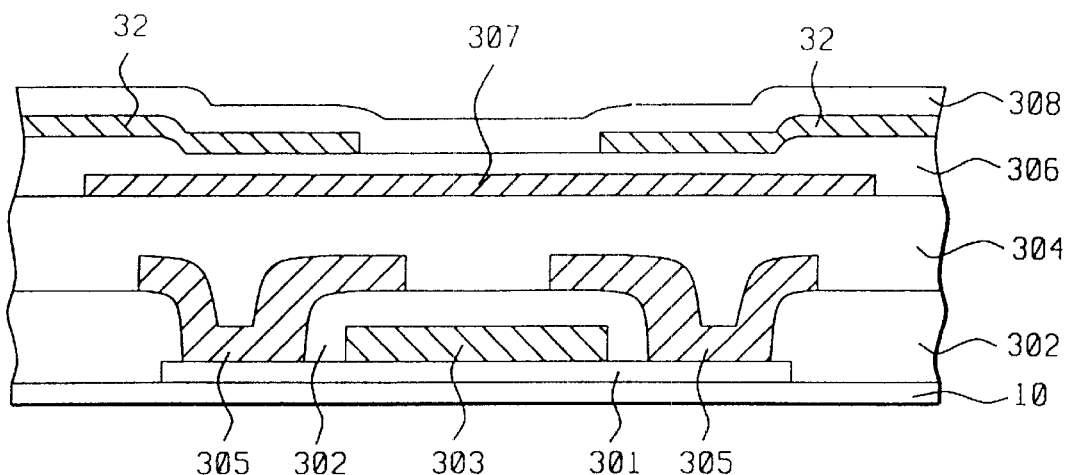
FIG. 3 is a schematic sectional view of a portion of a liquid crystal display manufactured according to the teachings of the present invention.

Referring now to FIG. 3, the process of the present invention begins with the provision of transparent plate 10 and then forming an array of TFTs on its upper surface with polysilicon layer 301 representing the active region of the device. Polysilicon gate 303 is formed over the gate oxide over this active region and dielectric layer 302 is deposited over the entire structure. Contact holes are then formed over the source and drain regions of the device, being then filled with metal so as to provide the electrical contact pads 305. Both polysilicon layers are doped (as will be known to those skilled in the art).

Next, dielectric layer 304 is laid down so as to fully insulate the TFT and its contact pads from its surroundings and then the black matrix layer 307 which is of opaque conductive material is laid down. Layer 307 is patterned to form the black matrix which covers the area occupied by the thin film transistors and slightly overlaps the pixels in its immediate vicinity. One or more optional additional steps may be introduced into the process at this stage.

Figure 6:
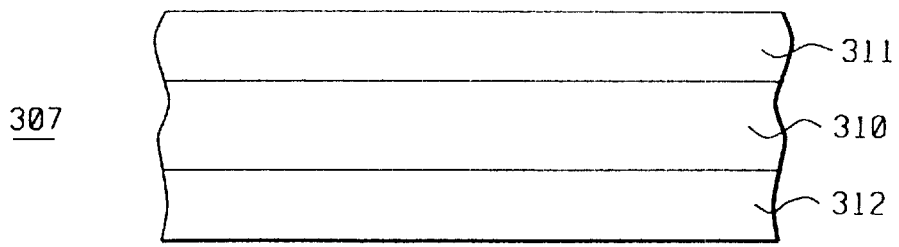
FIG. 6 illustrates how, optionally, the black matrix layer may made as a two or three layer laminate.

Prior to the deposition of layer 307, a layer of a material that has low reflectance, is a good conductor, and that allows good ohmic contact to appropriate areas on the TFT, may first be deposited (see layer 312 in FIG. 6). Several metal nitrides are good candidates for this extra layer, with titanium nitride being particularly well suited. After deposition of layer 310, a second layer of titanium nitride (or similar metal) 311 may, also optionally, be deposited over it, resulting in a three-layer laminate as seen in FIG. 6, with central layer 310 being any one of silver, copper, gold, and aluminum, all of which are known to be excellent conductors. We note that, by using one of these materials for layer 310, the thickness of layer 307 may be kept to a minimum thereby improving the planarity of the structure, the total thickness of black matrix layer 307 being between about 500 and 10,000 Angstroms. Alternatively a more complex structure may be used, e.g. Ti/TiN/Al/TiN.

With the black matrix in place, dielectric layer 306 is deposited over it as well as any exposed parts of layer 304. This is followed by the deposition of layer 32 which comprises a transparent conductive material such as ITO and then layer 32 is patterned and etched to form a regular array of conducting blocks, one over each pixel. In FIG. 3, two of these blocks can be seen, the intent being to show that they extend in both directions.

Once conductive blocks 32 have been formed, passivation layer 308 is deposited over them as well as over any exposed parts of layer 306. A second transparent plate (10 in FIG. 2), coated with a transparent conductive material such as ITO (31 in FIG. 2) is then bonded to the original plate containing the TFTs, but spaced about 1–5 microns apart. The intervening gap is then filled with liquid crystal material (20 in FIG. 2) and the process is complete.

2$^{nd}$ Embodiment

Figure 4:
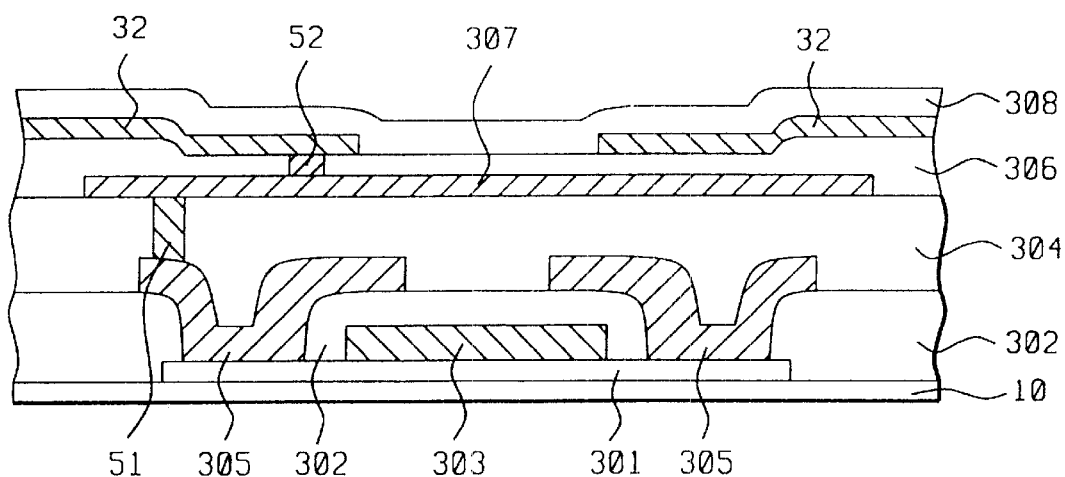
FIG. 4 is the schematic sectional view of FIG. 3 modified so that part of the black matrix is used to connect the TFT to one of the transparent sheet conductors.

As noted earlier, it is necessary to provide regular electrical connection between the conducting M1 and M3 layers 305 and 32. Referring now to FIG. 4, as a key feature of the present invention, the process of the first embodiment is modified so that, after the deposition of dielectric layer 304, via hole 51 is formed therein and then filled with a suitable conductive material such as aluminum or tungsten. Each via hole has a diameter between about 0.4 and 2 microns. Then, when black matrix layer 307 is laid down, it will be connected to one of the contact pads 305.

Then, after dielectric layer 306 has been laid down, via hole 52 is formed in it and also filled with a suitable conductive material such as aluminum or tungsten. Then, when conductive blocks 32 are laid down, they will be connected to black matrix layer 307 and hence to contact pad 305.

3$^{rd}$ Embodiment

Figure 5:
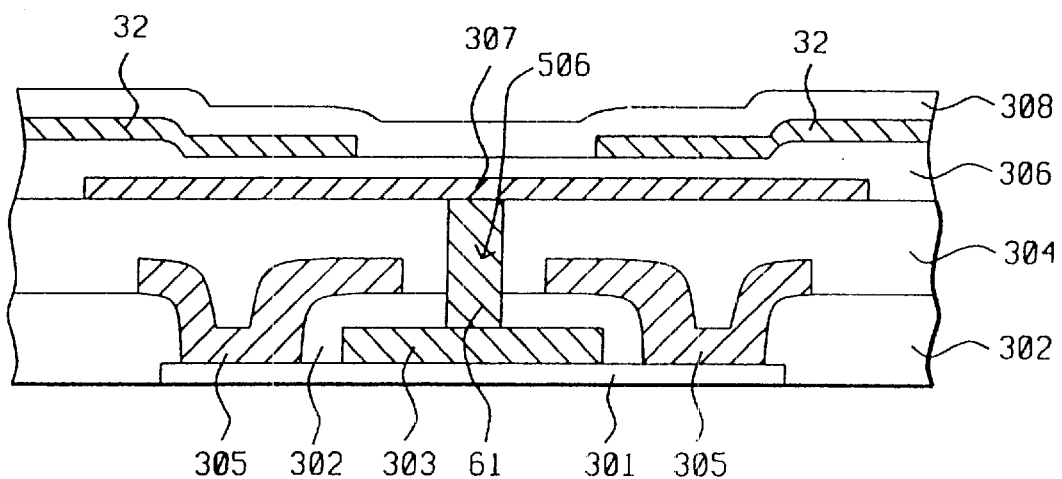
FIG. 5 is the schematic sectional view of FIG. 3 modified so that part of the black matrix is connected in parallel with the TFT gate, thereby reducing its series resistance.

As noted earlier, the series resistance of the semiconducting layers, such as the gate polysilicon layer 303, is often higher than ideal. Referring now to FIG. 5, as another key feature of the present invention, the process of the first embodiment is modified so that, after the deposition of dielectric layer 304, at least two via holes 61 are formed therein. Each via hole has a diameter between about 0.4 and 2 microns.

Only one via hole is seen in FIG. 5 because the other one lies outside the plane of the figure, directly in front of or behind the via hole that is shown. The via holes 61 are then filled with a suitable conductive material 505 such as aluminum or tungsten so that, when black matrix layer 307 is laid down as part of the next process step, that portion of gate 303 that lies between the two via holes 61 will be electrically in parallel with layer 307, thereby reducing the total series resistance of gate 303. Note that the black matrix layer 307 can be deposited at the same time that via 61 is filled.

Placing he conductive matrix in parallel with the gate polysilicon reduces the series resistance of the polysilicon from greater than about 20 ohms/square to less than 1 ohm per square. This is very important for long polysilicon interconnects which can exceed 1 cm in large displays.

4$^{th}$ Embodiment

Figure 7:
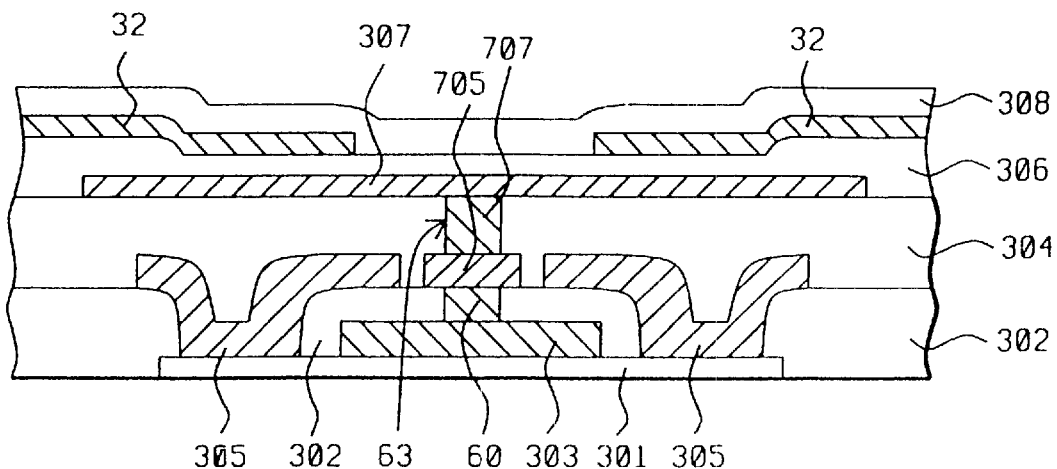
FIG. 7 shows a modification of FIG. 5 that improves the manufacturability of the process.

An alternative method for connecting the black matrix in parallel with the polysilicon gate is shown in FIG. 7. As can be seen, a gate pad in the form of an additional piece of metal 705 is formed at the same time as the source and drain contacts 305. Contact 60 is formed at the same time as the source and drain contacts are formed in dielectric 302. Via 63 is etched in dielectric 304 before depositing the black matrix. In this way the black matrix film 307 is connected electrically to the polysilicon gate via metal 707, metal 705 and metal contact 60. The advantage of this method is that it improves the planarity of the structure.

While the invention has been particularly shown and described with reference to the preferred embodiments thereof, it will be understood by those skilled in the art that various changes in form and details may be made without departing from the spirit and scope of the invention.

What is claimed is:

1. A liquid crystal display sub-structure, comprising:
   a plate of transparent insulating material on which is a thin film transistor having a source, a drain, and an active region;
   a first electrical contact pad for said source and a second contact pad for said drain and a polysilicon gate over the active region;
   a first dielectric layer that insulates said gate from said contact pads;
   a second dielectric layer that covers the first dielectric layer and the contact pads;
   on the second dielectric layer, a black matrix element, of opaque conductive material, located over said thin film transistor;
   on the black matrix element and the second dielectric layer, a third dielectric layer;
   on the third dielectric layer, an array of transparent conductive blocks that serve as pixel control elements;
   a via hole filled with conductive material that connects the pixel control element to the black matrix; and
   a via hole filled with conductive material that connects the black matrix to a contact pad, thereby providing electrical contact between a pixel control element and a contact pad, wherein each via hole has a diameter between about 0.4 and 2 microns and is filled with a metal selected from the group consisting of tungsten and aluminum.

2. The sub-structure described in claim 1, wherein the pixel control element is connected to the source of the thin film transistor.

3. The sub-structure described in claim 1, wherein the pixel control element is connected to the drain of the thin film transistor.

4. A liquid crystal display sub-structure, comprising:
   a plate of transparent insulating material on which is a thin film transistor having a source, a drain, and an active region;
   a first electrical contact pad for said source and a second contact pad for said drain and, over the active region, a polysilicon gate having a series resistance;
   a first dielectric layer that insulates said gate from said contact pads;
   a second dielectric layer that covers the first dielectric layer and the contact pads;
   on the second dielectric layer, a black matrix element, of opaque conductive material, located over said thin film transistor;
   on the black matrix element and the second dielectric layer, a third dielectric layer;
   on the third dielectric layer, an array of transparent conductive blocks that serve as pixel control elements; and
   two via holes filled with conductive material that connect the black matrix element to the polysilicon gate at two or more points, spaced a distance apart, thereby reducing the series resistance of the gate.

5. The liquid crystal display sub-structure described in claim 4 wherein each of said via holes further comprises a first via hole, that passes through the first dielectric layer and connects a gate pad to the polysilicon gate, and a second via hole that passes through the second dielectric layer and connects the black matrix element to the gate pad.

6. The sub-structure described in claim 4 wherein each via hole has a diameter between about 0.4 and 2 microns and is filled with a metal selected from the group consisting of tungsten and aluminum.

7. A process for manufacturing a liquid crystal display, comprising the sequential steps of:
   providing a first transparent plate having an upper surface;
   forming, on said upper surface, a plurality of thin film transistors each having a source, a drain, and an active region;
   forming an electrical contact pad for each source and each drain and a polysilicon gate over the active region;
   depositing a first dielectric layer that insulates said gate from said contact pads;
   depositing a second dielectric layer that covers the first dielectric layer and the contact pads;
   on the second dielectric layer, depositing a layer of opaque conductive material;
   patterning and etching said opaque conductive layer to form a black matrix that comprises an array of elements each of which is located over a thin film transistor;
   on the black matrix and the second dielectric layer, depositing a third dielectric layer;
   on the third dielectric layer, depositing a first layer of transparent conductive material and then patterning and etching said first transparent conductive layer to form an array of transparent conductive blocks that serve as pixel control elements;
   depositing a passivation layer on the third dielectric layer and on said pixel control elements;
   providing a second transparent plate having a lower surface;
   on said lower surface, depositing a layer of transparent conductive material;
   aligning the transparent plates to face, and lie parallel to, one another, thereby creating a space between them; and
   introducing and then confining liquid crystal material in said space, further comprising:
   prior to depositing the opaque conductive layer, forming via holes that pass through the on first and second dielectric layers and then filling said via holes with conductive material that contact the polysilicon gate electrode whereby, after its formation, the black matrix element is connected to the polysilicon gate at at least two points.

8. The process described in claim 7 wherein the step of depositing a layer of opaque conductive material further comprises:
   depositing a layer of a metal that is non-reflecting and that makes ohmic contact to silicon and then depositing thereon a layer of a metal selected from the group consisting of silver, copper, gold, tungsten, and aluminum.

9. The process described in claim 8 further comprising depositing a second layer of a metal, that is non-reflecting and that makes ohmic contact to silicon, over the metal selected from the group consisting of silver, copper, gold, tungsten, and aluminum.

10. The process described in claim 9 wherein the metal, that is non-reflecting and that makes ohmic contact to silicon is titanium or titanium nitride.

11. A process for manufacturing a liquid crystal display, comprising the sequential steps of:

prov一ding a first transparent plate having an upper surface;

forming, on said upper surface, a plurality of thin film transistors each having a source, a drain, and an active region;

forming an electrical contact pad for each source and each drain and a polysilicon gate over the active region;

depositing a first dielectric layer that insulates said gate from said contact pads;

depositing a second dielectric layer that covers the first dielectric layer and the contact pads;

on the second dielectric layer, depositing a layer of opaque conductive material;

patterning and etching said opaque conductive layer to form a black matrix that comprises an array of elements each of which is located over a thin film transistor;

on the black matrix and the second dielectric layer, depositing a third dielectric layer;

on the third dielectric layer, depositing a first layer of transparent conductive material and then patterning and etching said first transparent conductive layer to form an array of transparent conductive blocks that serve as pixel control elements;

depositing a passivation layer on the third dielectric layer and on said pixel control elements;

providing a second transparent plate having a lower surface;

on said lower surface, depositing a layer of transparent conductive material;

aligning the transparent plates to face, and lie parallel to, one another, thereby creating a space between them; and introducing and then confining liquid crystal material in said space, further comprising:

prior to depositing the opaque conductive layer, forming first via holes that pass through the first dielectric layer;

then, as part of the step of forming an electrical contact pad for each source and each drain, filling said first via holes with metal and forming gate pads on the first dielectric layer; and forming second via holes that pass through the second dielectric layer and then filling said second via holes with conductive material that contact the gate pads whereby, after its formation, the black matrix element is connected to the polysilicon gate at at least two points.

* * * * *